Dec. 27, 1966    J. S. POWELL ETAL    3,294,121
METHOD AND APPARATUS FOR INSERTING A TUBE INTO A PIPE
Filed June 7, 1963    2 Sheets-Sheet 2
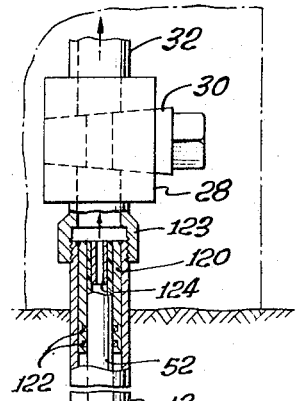
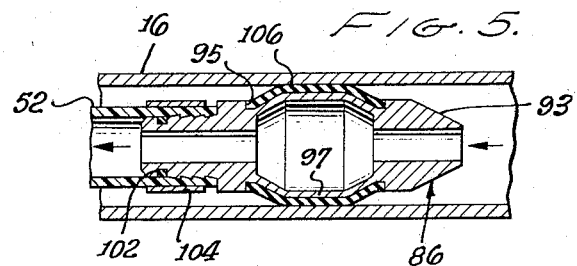
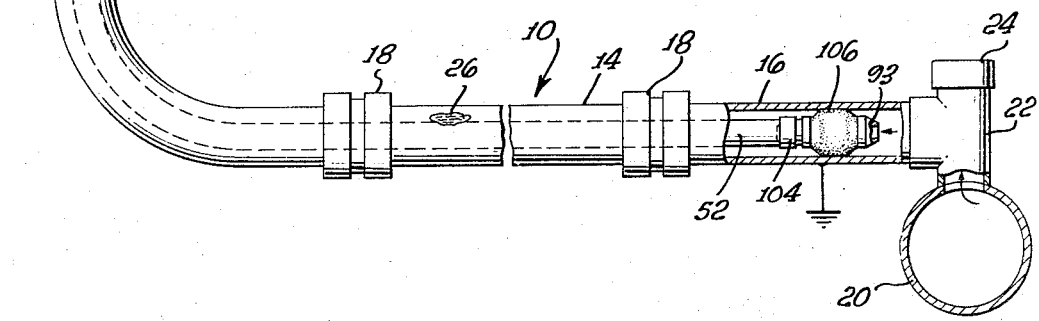
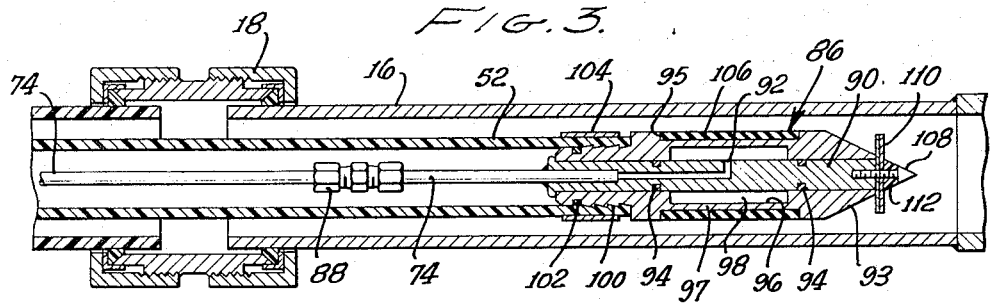
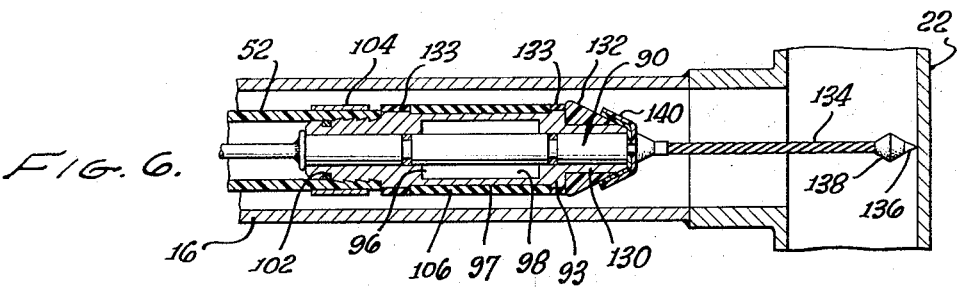
INVENTORS.
JONATHAN S. POWELL
PAUL WELDON
BY
Lyon+Lyon
ATTORNEYS.

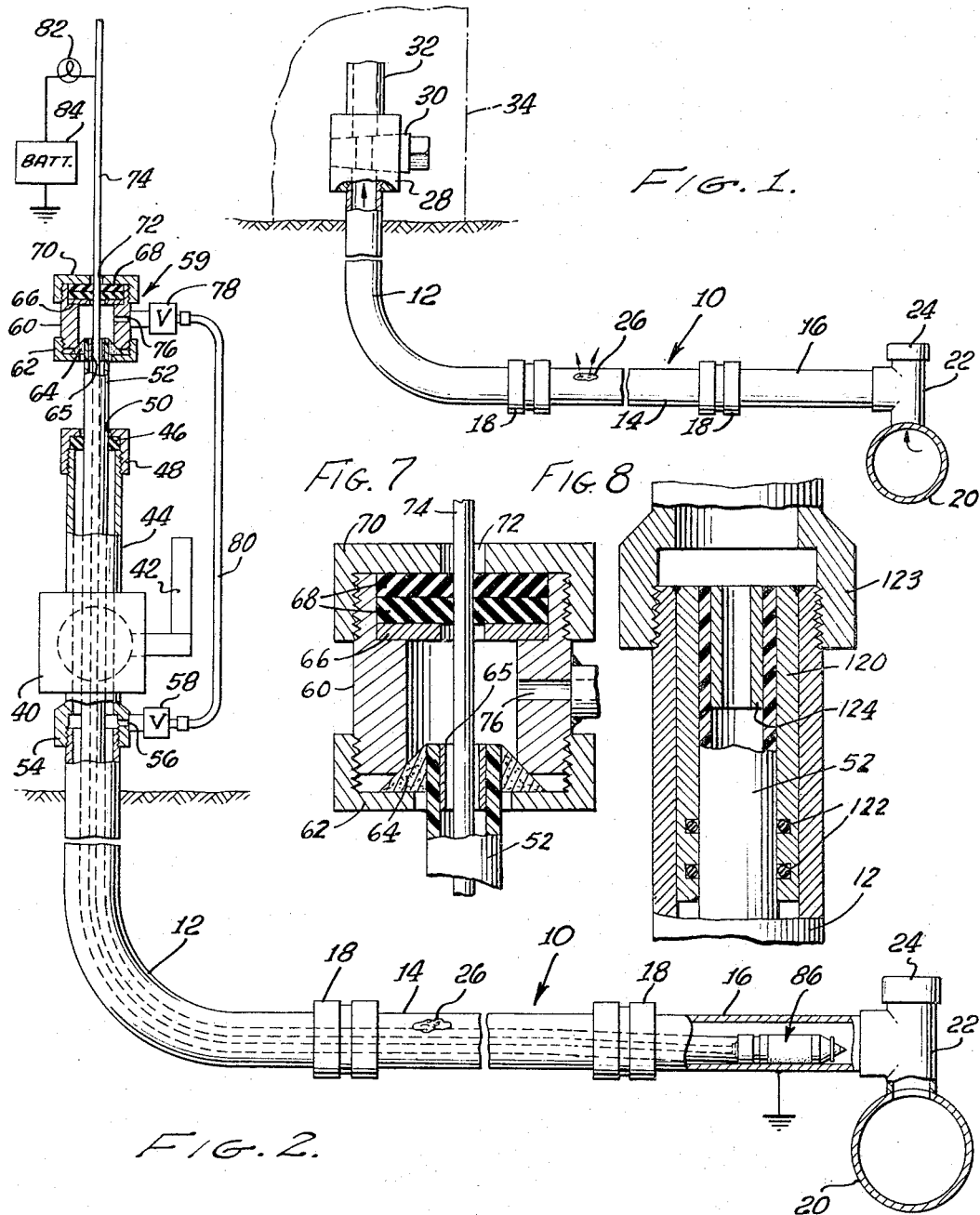

United States Patent Office 3,294,121
Patented Dec. 27, 1966

3,294,121
METHOD AND APPARATUS FOR INSERTING A TUBE INTO A PIPE
Jonathan S. Powell, Pasadena, and Paul Weldon, Orange, Calif., assignors to Southern California Gas Company, Los Angeles, Calif., a corporation of California
Filed June 7, 1963, Ser. No. 286,353
14 Claims. (Cl. 138—97)

This invention relates to a method and apparatus for lining a pipe and more particularly relates to a method and apparatus for providing a by-pass conduit within a leaky pipe whereby the leak is sealed off without the actual replacement of the leaky section.

It is often extremely inconvenient and very expensive to replace pipes or other conduits once they have been established in their desired location. For example, gas and water pipes leading from a central main under a street to individual houses along the street may develop leaks and their replacement generally requires the digging up of the lawn of the house or even the digging up of the street itself. As such leaks are developed fairly frequently, large numbers of men and equipment can be tied up if the excavating method of pipe repair is followed.

As a result of the expense involved in replacing such leaky pipes, a number of proposals have been made for repairing pipes in situ. Most of these proposals envision the use of a by-pass fitting inserted in the pipe from the house and positioned in the vicinity of the leak. The by-pass member generally has a sealing means at either end thereof and is set in sealing position by means of a special wrench provided for this purpose. This method of repair has several disadvantages.

First, it is difficult to be sure where the leak or leaks exist and thus the proper positioning of the by-pass fitting is very difficult. Moreover, the line may have several leaks rather widely separated and the by-pass fittings generally available are not long enough to seal them all off. In addition, the special wrenches necessary for setting the seals become unwieldy if the by-pass fitting has to be inserted any distance into the pipe.

According to the present invention, it has now been found possible to by-pass substantially the entire length of a leaky pipe extending between a central main and a position remote from the main. The by-passing is performed by inserting a plastic tubing from the remote position into the pipe to be repaired and pushing it through the pipe until it reaches a point close to the main. The tubing carries on its leading end an expander tool which can be expanded to cause a sealing member to make firm contact with the interior wall of the pipe. The invention is particularly valuable in maintaining gas lines serviceable even though a leak or leaks may have occurred in the original line.

It is therefore an object of the present invention to provide a method for lining a pipe or other conduit.

It is also an object of the present invention to provide apparatus for lining a pipe or other conduit.

It is another object of the present invention to provide apparatus for sealing a by-pass conduit in place within a pipe.

These and other objects and advantages of the present invention will become more apparent upon reference to the accompanying description and drawings in which:

FIGURE 1 is a view, partly in section, of a pipe having a leak of the type to be by-passed by the present invention;

FIGURE 2 is an elevation, partly in section, of a by-pass tube and expander tube of the present invention in position in a pipe to be replaced before the expander tube is expanded;

FIGURE 3 is a sectional elevation of a pipe with the expander tool of the present invention positioned therewithin;

FIGURE 4 is an elevation, partly in section, of the by-pass tube in the pipe after the expander tool has been expanded and then removed;

FIGURE 5 is a sectional detail of the sealing member of the present invention after it has been expanded into sealing relationship with the interior walls of the pipe; and FIGURE 6 is a view similar to FIGURE 3 showing a modification of the present invention.

FIGURE 7 is an enlarged view of the plastic end seal assembly of FIG. 2.

FIGURE 8 is an enlarged view of a portion of FIG. 4.

Referring now to FIGURE 1, there is shown a pipe or conduit 10 which may, for example, be a gas line. The pipe, which may be constructed of metal or plastic or both, consists of a riser section 12, a central section 14 and an end section 16, all of the sections being joined together by suitable couplers 18 or welded. Of course, the central section 14 will generally be made up of a plurality of interconnected pipe sections. The end section 16 is connected to a central main 20 by means of any suitable connection, for example, the T 22, the other end of which is closed by plug 24. A leak 26 is shown in the central section 14 of the pipe 10 although it is obvious that such a leak could occur anywhere along the length of the line.

The riser 12 is capped with a conventional stopcock 28 having a passageway therethrough which can be blocked by the rotation of a tapered plug 30. A conduit 32 leaves from the other side of the stopcock to the gas meter and to the gas operated appliances in the home, indicated by the dotted line 34.

Referring now to FIGURES 2, 3, 4 and 5, the details of one embodiment of the present invention are illustrated. In the embodiment shown in these figures, the central section 14 or the pipe 10 is made of a suitable non-metallic material, such as the plastic normally utilized for utility lines, and in particular gas lines. As can be seen from FIGURE 2, the stopcock 28 has been replaced by a full opening stopcock or ball valve 40 whose operation is controlled by a suitable lever 42.

One side of the stopcock 40 is connected to a pipe 44 having a sealing gland 46 at its upper end. The sealing gland 46 is held in place by a cap 48 that is threaded onto the pipe 44. The cap 48 is provided with an aperture 50 through which is inserted a plastic tubing 52 made, for example, of polyethylene. The sealing gland 46 cooperates with the plastic tubing 52 to prevent any gas from escaping from the annular space between the tubing 52 and the pipe 44 when the stopcock 40 is open.

The other end of the stopcock 40 is provided with a coupler 54 which is threadedly connected to the riser 12. The coupler 54 is provided with a passageway 56 located above the threaded portion of the coupler and a valve 58 is provided to control fluid flow through the passageway 56. For the sake of convenience, the entire assembly just described will be referred to as the plastic stuffing box assembly.

A plastic end seal assembly generally indicated at 59 is mounted to receive the end of the tubing 52. The assembly comprises a cylindrical member having a threaded cap 62 on its lower end which acts to press a suitable seal 64 against the tubing 52 when the cap 62 is tightened. To prevent collapse of the tubing 52, a stiffener sleeve 65 is inserted within the tubing 52. The cylindrical member 60 has a shoulder at its upper end and a metallic washer 66 is positioned on this shoulder and supports a sealing member 68. The sealing member is held in place by a cap 70 that is threadably connected to the cylindrical member 60. The cap 70 is provided with an aperture 72 through which passes a capillary tubing 74, preferably of copper. When the cap 70 is tightened on the member 60, the seal 68 will prevent the escape of any gas present within the member 60.

The member 60 is provided with a passageway 76 in the wall thereof between the two threaded sections. Fluid flow through the passageway 76 is controlled by a valve 78. The other side of the valve 78 is coupled to an equalizer tube 80 whose other end is connected to the other side of the valve 58. An electric lamp 82 has one side connected to the copper tubing 74 and the other side connected to one side of a battery 84, the other terminal of which is grounded. An expander tool and sealing assembly generally indicated at 86 is connected to the other end of the plastic tubing 52 and capillary tubing 74 and is shown resting in the end section 16 of the pipe 10. This end section 16 is also electrically grounded.

Referring now to FIGURE 3, the details of the expander tool and sealing assembly 86 are shown. As can be seen from this figure, the copper tubing 74 is made of several sections joined by any suitable connectors 88. To the last section of the copper tubing, there is soldered or otherwise connected an expander tool 90 having a passageway 92 therein that communicates with the interior of the tubing 74. An expansible metal sleeve 93 is positioned around the expander tool 90 which is provided with O-rings 94 to form a seal therewith. The expansible sleeve 93 is provided with an annular groove 95 in its outer surface and a second annular groove 96 in its inner surface, the two grooves forming a region of reduced wall thickness 97. The groove 96 also forms a chamber 98 around the expander tool 90 which is in communication with the passageway 92.

The expansible sleeve 93 is provided with a threaded portion 100 which cooperates with similar threads in the plastic tubing 52 to firmly connect the sleeve to the tubing. An O-ring 102 forms a seal between these two members. A retaining ring 104 on the outer surface of the tubing 52 prevents the tubing from pulling away from the threaded connection.

A sealing sleeve 106 of rubber of similar material is positioned around the outside of the expansible sleeve 93, preferably in the groove 95. A cone 108 of insulating material is fastened to the front of the expander tool 90 by screw 112 which cooperates with a suitable aperture in the expander tool 90 to hold one or more shear disks 110 in place. These shear disks prevent the withdrawal of the expander tool 90 from the expansible sleeve 93 unless a certain predetermined force is exceeded. A knob on the rear of the expander tool 90 prevents it from being pushed completely through the sleeve 93.

The manner in which the equipment just described can be successfully used to by-pass a leak in a pipe will now be described. After the leak has been discovered, the distance from the main 20 to the stopcock 28 is determined and a suitable length of plastic tubing 52 is cut, allowing several feet extra. A suitable length of capillary tubing 74 carrying the expander tool 90 at the end thereof is then inserted into the plastic tubing 52. The expander tool 90 is pushed through the sleeve 93 and the cone 108 and disks 110 then connected to prevent withdrawal of the tool 90 from the sleeve 93. The retainer ring 104 is positioned about the end of the plastic tubing 52 and the expansible sleeve 93 threaded onto the tubing.

The metal stiffener sleeve 65 is inserted in the other end of the tubing 52 and the plastic end seal assembly 59 installed on the end of the tubing 52, caps 64 and 70 being tightened to form firm seals around the tubing 52 and tubing 74. The stopcock 28 is now removed and the plastic stuffing box assembly installed in its place using a standard stopcock changer which permits removal of the stopcock and replacement with the plastic stuffing box assembly without any gas leakage. The equalizer hose is now connected and the valves 58 and 78 opened. This enables a soap test to be made on the connection between the expansible sleeve 93 and the plastic tubing 52.

The indicator light 82 is now connected to the tubing 74, and the expander tool and sealing assembly 86 and tubing 52 is shoved through the aperture 50 in the cap 48 and the cap tightened so that a seal is formed around the tubing 52. The stopcock 40 is now opened and the insertion of the tubing 52 continued until the expander tool and sealing assembly 86 enters the end section 16 of the pipe 10. This entry is signalled by the illumination of the lamp 82 because of the completion of the electrical circuit from the battery 84 through the lamp 82, the tubing 74, the expander tool 90, the expansible sleeve 93, and the metal section 16 back to ground.

Since the riser pipe 12 is generally also made of metal, the lamp will be illuminated briefly immediately after the tubing is pushed through the stopcock 40; however, it will readily be determined from the length of tubing remaining that the expander tool and sealing assembly 86 has not entered the main portion of the pipe. Once it does, the plastic section 14 of the pipe will break the electrical circuit and the lamp 82 will be turned off. When the lamp again lights, the assembly 86 will have reached the section 16. The tubing 52 should be pushed in several more inches to make sure that the assembly 86 is completely within the section 16.

The capillary tubing 74 is now connected to a pump (not shown) and fluid under pressure delivered to the expander tool 90. This pressure causes the region of reduced wall thickness 97 of the sleeve 93 to expand until the rubber sleeve 106 is firmly seated against the wall of the pipe 16. During this time, any pressure differences existing between the annular space around the outer surface of the tubing 52 and the annular space around the tubing 74 within the tubing 52 is equalized by means of the equalizing tube 80 so that the tubing 52 is prevented from collapsing.

Once the seal has been made in the pipe section 16, the pump can be disconnected and the expander tool 90 removed by pulling firmly on the tubing 74. The condition of the pipe after such a removal is shown in FIGURES 4 and 5. In FIGURE 4, the riser end of the plastic tubing 52 has been provided with a riser seal 120 preferably in the form of a metal sleeve having a pair of O-rings 122 to form a seal with the tubing 52. This metal sleeve 120 is welded to the top of the riser 12 to hold it firmly in place and also to form a seal between these two members. A cap 123 is screwed to the top of the riser 12. The tubing 52 is preferably provided with a stiffener sleeve 124 to prevent the tubing from collapsing.

This assembly may be seen in FIGURE 4 in which the original stopcock 28 has been replaced.

The removal of the expander tool 90 is accomplished in the following manner. After the sleeve 93 has been expanded, the pump is disconnected, valves 58 and 78 closed, and the equalizer tube 80 removed. The valve 58 may now be opened and the pressure in the annular space between the pipe 10 and tubing 52 bled down and the seal made by the sleeve 106 tested for leaks.

The plastic end seal assembly 59 and the plastic stuffing box assembly are now removed. No gas is able to enter the house because the annular space between the pipe 10 and tubing 52 is blocked by the sleeve 106 and the tubing 52 itself is blocked by the expander tool 90. The plastic tubing 52 is now cut to the proper height relative to the riser 12 and the sealing sleeve 120 inserted over the tubing 52 and welded in place. The stiffener sleeve 124 is then inserted in the interior of the tubing 52.

The original stopcock 28 is now inserted in place on the cap 123 and the plug 30 rotated an amount sufficient to pass the expander tool 90 therethrough. A tension force can now be exerted on the tubing 74 sufficient to shear the disks 110 and withdraw the expander tool 90 from the sleeve 93. Since this step will enable gas to flow through the tubing 52, an assembly similar to the assembly 59 without the bottom cap 62 and seal 64 should be telescoped over the tubing 74 and threaded onto the house side of the stopcock 28. This will form a seal around the tubing 74 and prevent gas from escaping into the house.

After the expander tool has been passed through the stopcock 28, the stopcock 28 is closed by rotating the plug 30 90 degrees and the sealing assembly removed from the stopcock 28. The expander tool 90 is then also removed. The stopcock 28 again is connected to the meter and the stopcock 28 opened to resume gas service. The gas now flows through the tubing 52 rather than through the pipe 10 and the leak 26 is completely sealed off by the rubber sleeve 106 at one end and the sealing sleeve 120 at the other.

If desired, the riser end seal can be established in generally the same manner as the main end seal. That is, a rubber sealing sleeve can be positioned around the riser end of the tubing 52 and an expansible metal sleeve inserted within the tubing 52. The procedure just described is followed with the exception that when the expander tool 90 is withdrawn into the expansible sleeve, pressure is again applied with the result that the expansible sleeve expands out and presses the rubber sealing sleeve tightly against the riser pipe 12. This simplified expander assembly may also be used in the pipe section 16 if desired.

A modification of the expander tool and sealing assembly 86 is shown in FIGURE 6. In this figure, elements identical to those shown in FIGURE 3 are indicated by the same reference numerals. As can be seen, the expansible sleeve is provided with a reduced portion 130 at its forward end, and a cone 132 of insulating material is positioned around this reduced portion and extends radially beyond the peripheral surface of the expansible sleeve 93. Insulating sleeves 133 are positioned around the exposed portions of the sleeve 93. The front end of the assembly is provided with an extending probe 134 of electrically conductive material such as braided copper wire.

The probe has an electrically conductive tip 136 that is connected to the probe 134 and surrounded by an insulating material 138. The probe 134 is electrically and mechanically connected to the expander tool 90 which is held in place relative to the sleeve 93 by electrically insulating shear disks 140.

The assembly shown in FIGURE 6 is suitable for use with pipes that are constructed entirely of metal. If the assembly shown in FIGURE 3 were used in such a pipe, the lamp 82 would be continually illuminated. However, with the assembly shown in FIGURE 6, the insulation 132 and 133 assures that no electrical contact is made between the assembly and the pipe until the tip 136 engages the wall of the T 22. At this time the lamp indicates that the assembly is properly positioned and the expander tool may be actuated. All other steps of the operation are identical with those described above.

It can be seen from the foregoing description that a new and improved method and apparatus for lining a pipe has been provided. While the invention has been described in connection with a gas service line, it is to be understood that it is of equal utility in any other piping system. The use of the present invention enables the bypassing of a leak in a pipe and moreover effectively replaces the pipe itself so that other leaks occurring in the old pipe will not interfere with fluid distribution. The apparatus can be quickly and easily installed and requires no excavating or other costly labor consuming techniques.

The invention may be embodied in other specific forms not departing from the spirit or essential characteristics thereof. The present embodiments are therefore to be considered in all respects as illustrative and not restrictive, the scope of the invention being indicated by the claims rather than by the foregoing description, and all changes which come within the meaning and range of equivalency of the claims are therefore intended to be embraced therein.

We claim:

1. Apparatus for lining a pipe, comprising in combination: a tubular member for insertion into said pipe; an expansible metal sleeve positioned at the end of said member and being at least partially within said member; an annular sealing member for cooperation with said sleeve whereby radial expansion of said sleeve causes said sealing member to establish sealing engagement with the inner surface of the pipe; an expanding tool positioned within said expansible sleeve, said tool when supplied with fluid under pressure causing the radial expansion of said sleeve; and means for supplying fluid under pressure to said tool.

2. Apparatus for lining a pipe, comprising in combination: a tubular member for insertion into said pipe to provide a flow path other than said pipe; and an assembly for establishing a seal between one end of said tubular member and said pipe, said assembly including an expansible metal sleeve connected to said end of said tubular member, said sleeve having an annular groove formed in the inner surface thereof to establish a region of reduced wall thickness, an annular sealing member positioned on the outer surface of said sleeve and overlying said region of reduced wall thickness, an expander tool positioned within the bore of said sleeve and being in sealing engagement with the inner surface of said sleeve on both sides of said groove, said expander tool having a passageway therein communicating with said annular groove, means for preventing relative movement between said sleeve and said tool until a predetermined force is exerted on said tool, and means for supplying fluid under pressure to the passageway in said tool.

3. The apparatus of claim 12 wherein a second annular sealing member is provided around the other end of said tubular member to block the annular space between said other end of said tubular member and the pipe.

4. The apparatus of claim 2 wherein a second annular sealing member is provided around the other end of said tubular member to block the annular space between said other end of said tubular member and the pipe.

5. The apparatus of claim 2 wherein said tubular member comprises a flexible plastic tubing.

6. A method of lining a pipe, comprising: inserting a first tubing into a second tubing; fastening an expander tool to the end of said first tubing and an expansible sleeve to the end of said second tubing; inserting said expander tool in said sleeve; inserting said second tubing into said pipe a desired distance; supplying fluid under pressure through said first tubing to said expander tool to cause said sleeve to expand and engage the interior wall of said pipe; and removing said first tubing and expander tool from within said second tubing.

7. A method of lining a pipe, comprising: inserting one end of a first tubing into a second tubing; fastening en expander tool to said one end of first tubing and an expansible sleever to one end of said second tubing; inserting said expander tool in said sleeve; inserting said one end of said second tubing into said pipe a desired distance; supplying fluid under pressure through said first tubing to said expander tool to cause said sleeve to expand and engage the interior wall of said pipe; removing the pressure on the fluid in said first tubing; forming a seal between the other end of said second tubing and the interior wall of said pipe; and withdrawing said first tubing from said second tubing.

8. The method of claim 7 wherein said seal is formed by inserting and expanding metal sleeve in said second tubing, positioning an annular sealing member about said second tubing and overlying said metal sleeve, positioning said expander tool within said metal sleeve, and supplying fluid under pressure to said tool to cause said metal sleeve to expand and force said sealing member into engagement with the interior wall of said pipe.

9. The method of claim 7 wherein said seal is formed by inserting a stiffener sleeve in said second tubing and positioning an annular sealing member about said second tubing and overlying said stiffener sleeve, and forming a fluid tight connection between said sealing member and said pipe.

10. A method of bypassing a leak in a fluid service pipe extending from a main to an outlet in a building, comprising: inserting one end of a first tubing into a second tubing; fastening an expander tool to said one end of said first tubing and an expansible sleeve to one end of said second tubing; inserting said expander tool in said sleeve; establishing a sealing connection between said first tubing and the other end of said second tubing; adapting said outlet to sealingly receive said expander tool, expansible sleeve and second tubing; inserting said expander tool, expansible sleeve and second tubing into said outlet and said pipe a desired distance; supplying fluid under pressure through said first tubing to said expander tool to cause said sleeve to expand and engage the interior wall of said pipe; removing the pressure on the fluid in said first tubing; forming a seal between said other end of said second tubing and the interior wall of said pipe; and withdrawing said first tubing from said second tubing whereby said expander tool is withdrawn from said sleeve.

11. A method of bypassing a leak in a fluid service pipe extending from a main to an outlet in a building, the outlet having a stopcock for regulating the fluid flow therethrough, comprising: inserting one end of a first tubing inside a second tubing; fastening an expander tool to said one end of said first tubing and an expansible sleeve to one end of said second tubing; inserting said expander tool in said sleeve; establishing a sealing connection between said first tubing and the other end of said second tubing; removing said stopcock and adapting said outlet to sealingly receive said expander tool, expansible sleeve and second tubing; inserting said expander tool, expansible sleeve and second tubing into said adapted outlet and thence into said pipe a desired distance; supplying fluid under pressure through said fluid tubing to said expander tool to cause said sleeve to expand and engage the interior wall of said pipe; removing the pressure on the fluid in the first tubing; disconnecting said first tubing and said other end of said second tubing; returning said outlet to its non-adapted condition; forming a seal between said second tubing and said outlet; replacing said stopcock; and withdrawing said first tubing from said second tubing whereby said expander tool is withdrawn from said sleeve and said second tubing.

12. Apparatus for lining a pipe, comprising in combination: a tubular member for insertion into said pipe; an expansible metal sleeve connected to the end of said tubular member, said sleeve having an annular groove formed in the inner surface thereof to establish a region of reduced wall thickness; an annular sealing member positioned on the outer surface of said sleeve and overlying said region of reduced wall thickness whereby radial expansion of said region of reduced wall thickness as a result of an increase in pressure in said groove causes said sealing member to establish sealing engagement with the inner surface of the pipe; an expander tool insertable into the bore of said sleeve and having a passageway therein communicating with said groove; and means for supplying said passageway with fluid under pressure.

13. The apparatus of claim 2 wherein a source of electrical power and an indicating means for indicating the flow of current are coupled to said pipe and to said expander tool.

14. A method of lining a pipe having at least one metal portion, comprising: inserting one end of a first tubing into a second tubing; fastening an expander tool to said one end of said first tubing and an expansible sleeve to one end of said second tubing; inserting said expander tool into said sleeve; connecting an electrical circuit including a source of power and an indicator between said metal portion of said pipe and said expander tool; inserting said one end of said second tubing into said pipe until said expander tool is brought into electrical engagement with said metal portion of said pipe whereby said indicator is actuated; supplying fluid under pressure through said first tubing to said expanded tool to cause said sleeve to expand and engage the interior wall of said pipe; removing the pressure on the fluid in said first tubing; forming a seal between the other end of said second tubing and the interior wall of said pipe; and withdrawing said first tubing and said expander tool from said second tubing.

References Cited by the Examiner
UNITED STATES PATENTS

| 2,130,030 | 9/1938 | Richardson | 138—93 |
| 2,279,257 | 4/1942 | Svirsky | 138—93 |
| 2,829,675 | 4/1958 | Mueller et al. | 138—97 |
| 2,978,029 | 4/1961 | O'Reilly et al. | 166—123 X |
| 3,097,696 | 7/1963 | Orr | 166—123 X |

LAVERNE D. GEIGER, *Primary Examiner.*

LOUIS J. LENNY, *Examiner.*

T. MOORHEAD, *Assistant Examiner.*